United States Patent [19]
Offer et al.

[11] Patent Number: 5,977,504
[45] Date of Patent: Nov. 2, 1999

[54] METHOD AND APPARATUS FOR GUIDING MULTIPLE FILLER WIRES IN WELDING GROOVE

[75] Inventors: Henry Peter Offer, Los Gatos; Leonard John Sharpless, Palo Alto, both of Calif.

[73] Assignee: General Electric Company, San Jose, Calif.

[21] Appl. No.: 08/896,253

[22] Filed: Jul. 17, 1997

[51] Int. Cl.[6] .................................................. B23K 9/167
[52] U.S. Cl. ........................ 219/75; 219/136; 219/137.2
[58] Field of Search ................................ 219/75, 125.11, 219/125.12, 136, 137.2, 137.7, 137.8; 239/599

[56] References Cited

U.S. PATENT DOCUMENTS

| | | | |
|---|---|---|---|
| 4,179,059 | 12/1979 | Chang et al. | 219/75 |
| 4,188,526 | 2/1980 | Asano | 219/137.8 |
| 4,591,685 | 5/1986 | Hinger et al. | 219/136 |
| 4,649,250 | 3/1987 | Kazlauskas | 219/125.11 |
| 4,902,873 | 2/1990 | Ivannikov | 219/137.2 |
| 5,714,735 | 2/1998 | Offer | 219/75 |
| 5,725,722 | 3/1998 | Eshleman | 239/599 |

*Primary Examiner*—Clifford C. Shaw
*Attorney, Agent, or Firm*—James E. McGinness; Dennis M. Flaherty

[57] ABSTRACT

A guide nozzle for feeding multiple fusible filler metal wires into reduced-width, high-aspect-ratio (ratio of depth to width) metallic joints with control and stability of the filler metal position as it enters the molten pool area. The multiple filler wires are fed concurrently at the same or different feed rates. The guide nozzle is fabricated by flattening a circular tube into an oval or elliptical shape. In the case when the filler wires have the same diameter, the resulting oval or elliptical hole in the guide nozzle has a height greater than two times the diameter of the filler wires and a width greater than one diameter but less than two times the diameter of the filler wire. Alternatively, the guide nozzle is formed by forming a flat side on each of two circular tubes and then joining the flat sides together. Each tube has a circular hole of diameter greater than the diameter of the filler wire to be guided therein.

21 Claims, 3 Drawing Sheets

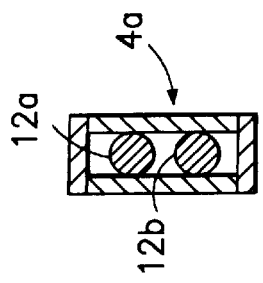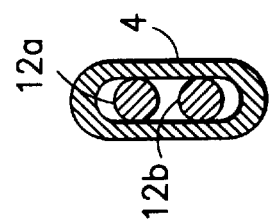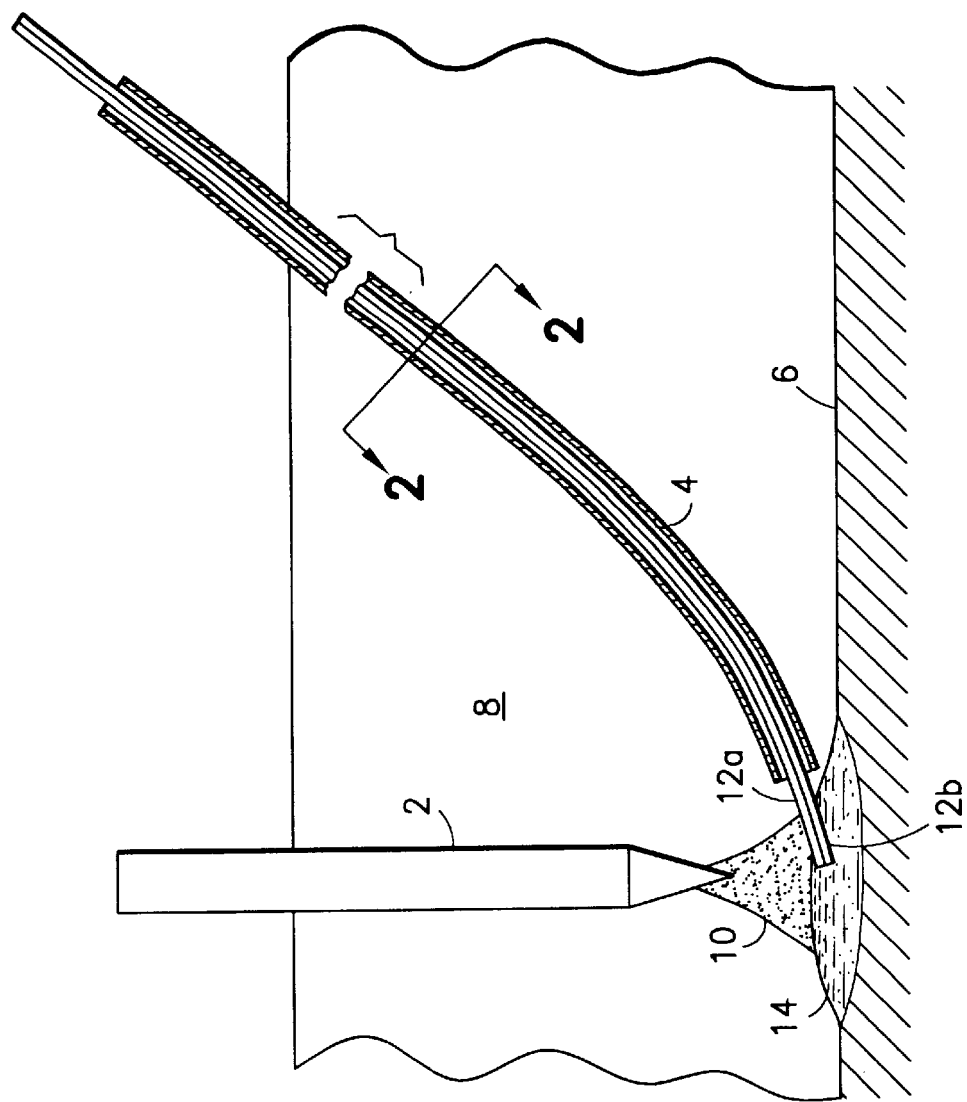

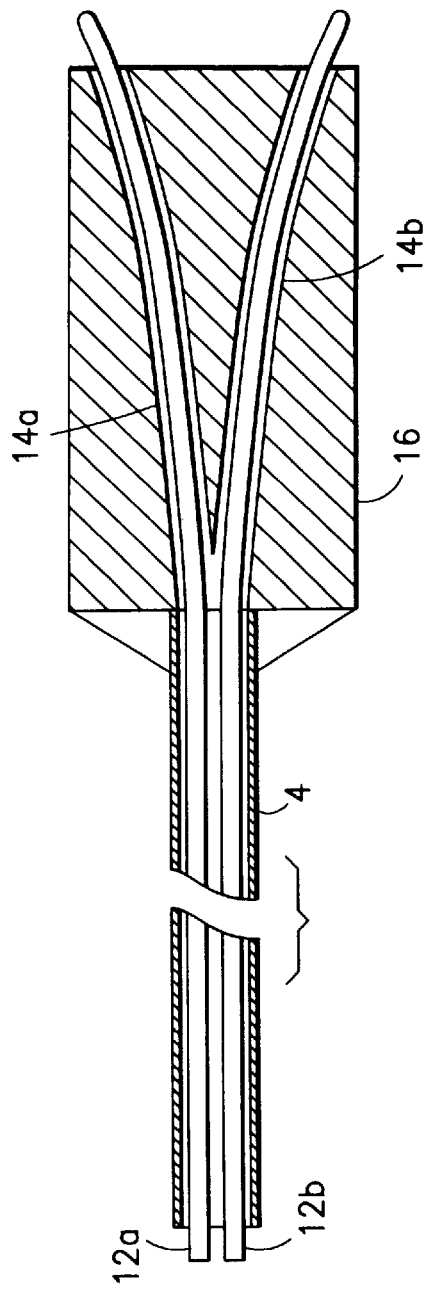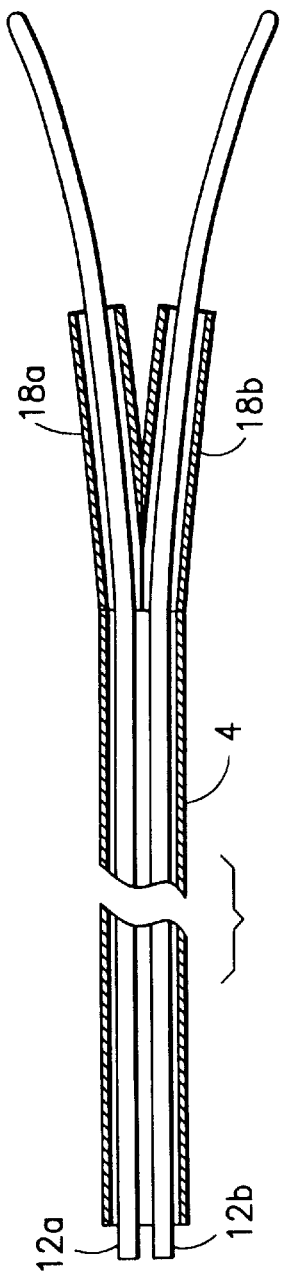
FIG.3
FIG.4

METHOD AND APPARATUS FOR GUIDING MULTIPLE FILLER WIRES IN WELDING GROOVE

FIELD OF THE INVENTION

This invention generally relates to methods and apparatus for joining components. In particular, the invention relates to automated welding in a groove of small width for joining metal components.

BACKGROUND OF THE INVENTION

Conventional mechanized and automatic welding (and to a lesser extent brazing) practice has focused on methods for improvement in the joint microstructural condition and residual stress level, especially for materials susceptible to stress-induced cracking such as stress corrosion cracking (SCC). In addition, emphasis has been placed on improving the joining productivity while maintaining or increasing the joint quality, especially for thicker section materials. One of these modifications, relative to conventional V-groove joints, has been to decrease the volume of the filler deposited by reducing the width of the weld joint. This technique is known in the art: as "narrow groove" (or narrow gap) welding. As the joints are made thinner with steeper side wall angles, there are width and aspect ratio limitations on the joint design which can be reliably completed, even when using only a single filler material. As the technical and practical needs increase to make joints even thinner, the difficulty of locating and precisely controlling the feeding of multiple, nonparallel filler materials into these narrow and relatively deep joints using conventional equipment and procedures becomes even greater, or is impractical for many applications.

An additional problem for thin, high-aspect-ratio joints is the limitation in the filler deposition rate and corresponding joint completion rate, which are strongly controlled by the maximum practical filler melt-off rate that does not result in risk of lack of fusion or other defects. The practice of feeding only a single filler into the molten pool at any point in time during the deposition of a filler pass is inherently limited in its thermal efficiency for utilizing the most power of the heat source. The feeding of two fillers simultaneously, one of which is fed into the molten pool but intentionally not located in the hottest or most effective melting portion of the heat source, is also inherently limited in thermal efficiency. These practices result in undesirable limitations on the filler melt-off rate and productivity.

Commercial systems are available for feeding multiple filler wires. The general approach used in the welding industry for multiple filler material addition is to feed using two nozzles, each feeding at different times. The nozzles are aimed from different directions, typically from the leading and trailing sides of the torch (or other heat source), with respect to the direction of torch travel. One scheme is to feed from the two opposing, non-parallel nozzles alternately as the direction of torch travel is periodically changed from a forward to a reverse direction, such as to continue an orbital joining application while rewinding cables which have become wrapped around a component while traveling in the forward direction during the deposition of multiple fill passes. This commercially available system configuration is commonly called "dual wire feed" and allows a productivity improvement for some multi-pass, bidirectional travel applications.

Another known scheme is to feed from two opposing, non-parallel nozzles simultaneously while welding in either the forward, reverse or both directions, typically in an attempt to improve the filler deposition rate. One variation of this scheme is to try to align both filler nozzles, and therefore the aim points of both wires, to the desired part of the molten pool (under the heat source).

Another variation used with lateral torch and filler material oscillation is to synchronize the aim of one filler nozzle to the current position of the heat source, and to synchronize the other nozzle to be aimed into the portion of the molten pool from which the heat source has just moved in an effort to utilize some of the excess/residual heat remaining in the pool. In this latter configuration, the "chill" filler material feed rate typically is only a small fraction of the primary feed rate. This system is claimed to improve productivity by the use of the additional out-of phase trailing-side chill wire feed.

A number of welding systems are commercially available which allow pulsing of a single filler material between two feed rates synchronized with pulsing of the arc between two power levels. At higher pulse frequencies, however, the combination of mechanical slack in the drive mechanism (motor gearheads, etc.) and the clearance between the inside dimension of the filler conduit and the outside dimension of the filler material cause the individual feed rates to be smeared into an average value as the filler leaves the outlet end of the feed nozzle. Effectively, this averaging condition is aggravated by the mechanical inertia of the drive mechanisms, and results in inefficient use of the significantly greater filler material heating and melting capability of the higher power level. The heating and melting capability of an electric welding arc, for example, is proportional to the square of the current, so that high current levels are significantly more effective in melting filler material than lower current levels.

Conventional filler nozzles are stiff and, due to their large width, cannot be inserted into a very thin joint. The standard approach of increasing the filler stickout beyond the end of the nozzle in order to reach into a thin joint is limited by the lack of filler position control near the bottom of such joints if they are deep, as is the case in thicker materials. This lack of position control not only leads to filler melting inefficiencies as the aim to the hottest part of the arc is degraded, but also leads to electrode contamination, fusion defects, and process terminations when the filler material inadvertently contacts the (nonconsumable) electrode and disturbs the arc geometry and thermal properties.

Multiple filler material equipment designs utilizing individual nozzles for multiple feed applications use straight guide tubes which do not automatically compensate for the fact that the unsupported filler shape is not straight, and that the end does not follow a straight path after leaving the nozzle. This design has the disadvantage of providing no aiming control of the wire position after it leaves the outlet end of the nozzle, to compensate for the fact that the wire has a "cast" or helical configuration remaining from the permanent bending that occurs as it is wound on circular spools. The previously bent wire springs back into the curved configuration, reflecting a portion of the bending strain it had when on the spool. This curvature is typically accounted for as the filler is initially positioned relative to the heat source (such as the tip of a non-consumable electrode), and in some cases can be manually overridden during the course of the joining with the use of multi-axis motorized filler nozzle positioners. This method relies on an operator for periodic aiming adjustments, and would be very tedious when more than one filler is fed at the same time, especially with high-speed joining practices.

SUMMARY OF THE INVENTION

The present invention is an apparatus for feeding multiple filler materials into reduced-width, high aspect-ratio (ratio of depth-to-width) weld or braze joints. The apparatus of the invention facilitates joining with improved control and stability of the filler material position as it enters the heat source and adjacent molten pool area. The apparatus also provides higher filler melting thermal efficiency and corresponding deposition (melt-off) rates, resulting in joint material properties and joining productivity benefits significantly above conventional, more complex practices. These improvements are realized using a multiple-filler nozzle apparatus.

The apparatus of the invention provides improved position control of the filler material as it enters the molten pool during weld joining processes. For joining materials utilizing a thin joint design having a significantly high aspect ratio (of joint depth to width), a minimum thickness, stable position nozzle is desired in order to minimize joint width, and therefore minimize joint volume for a predetermined parent material thickness. Reductions in joint volume can lead directly to reductions in the amount of filler material required and the corresponding welding time to deposit the filler, thereby reducing welding costs. The nozzle can be used with many welding or torch brazing processes, and is suited for either cold-wire or hot-wire filler addition.

In accordance with the invention, the guide nozzle allows simultaneous feeding of multiple, parallel filler wires which are positioned closely adjacent to or in contact with each other through a single non-circular hole or through multiple circular holes. This configuration enables the nozzle to be thinner than if a single wire of greater thickness were used, and more positionally stable than if multiple nozzles of a similar thickness were used. The design having a noncircular hole enables the nozzle to be easier to fabricate than a multi-hole nozzle of the same thickness.

The use of a nozzle capable of feeding multiple, generally parallel filler materials can significantly improve joining productivity while simultaneously keeping the heat input at a minimum, which is a key feature of the new configuration. The main technical features which provide for more efficient heat transfer to and through the filler material from an external heat source, such as an arc or a power beam, are the following:

1. The total surface convection area for heat transfer into a given length of multiple wires, as compared to the area of a single wire having the same length and volume (but correspondingly greater thickness), is significantly increased.

2. The thickness for a non-circular shape (or shorter radius and diameter for a circular shape) of the smaller wire which the externally supplied heat must be conducted through, before the wire is fully melted to its center and then across its full diameter, is significantly reduced.

3. The time this multiple filler material surface area is exposed to the heat source is significantly increased and is proportionally greater than that of a single smaller wire fed at a faster linear rate.

4. The position of multiple filler materials as they near the weld or braze pool may be favorably selected with respect to the preferred position in the temperature distribution across the heat source, allowing better heat transfer and therefore higher thermal efficiency for the joining process. The predetermined outlet angle and spacing between the nozzle holes determines the filler convergence position.

5. The multiple filler materials can be located in closer proximity to each other, allowing better mixing and chemical homogeneity of the deposit when wires of different compositions are melted to yield a composite or tailored alloy.

6. The redundancy of the multiple filler materials allows variations in the feed rate of one or more of the fillers to be accommodated with less disturbance of the melting process, since each filler represents only a fraction of the total melt-off rate.

7. The spacing of the end of the filler material relative to the non-consumable electrode, if present, is significantly improved due to the inherently greater stiffness of the multiple filler nozzle.

Each of the foregoing effects (¶¶ 1–7) allows the minimum required power of the weld or braze heating source to be reduced when using the multiple finer wires, and in turn improves the thermal efficiency of the weld or braze joint. Together, they provide an even greater improvement in melting thermal efficiency. The thermal efficiency is improved since with lower power input to fill a joint having a fixed volume, less power is wasted in melting excess base material. In addition, less thermal damage occurs in the components joined (such as local shrinkage, overall distortion, and microstructural damage in the heat-affected zone).

In addition to the filler melt-off rate, another significant limiting factor in welding productivity is typically the maximum size of the weld pool that can be maintained in a stable manner while balancing the competing forces of gravity and surface tension. Use of thermally efficient multiple filler wires of smaller size fed directly under the arc, as allowed by the flat wire-feed multiple nozzle configuration, provides a higher filler deposition rate as compared to the out-of-phase trailing-side chill wire feed or the single-wire feed prior art methods). This effect is possible since the volume of base material which is correspondingly melted with this practice is reduced, and in turn keeps the total volume of metal melted at any point in time within practical limits. The use of multiple wires fed at slower linear speed, rather than one wire fed at higher speed with a volumetrically equivalent feed rate, also permits inertia allowances for the wire spool drive during starts and stops to be relaxed. This consideration is important when feeding at very high speeds, or from massive wire spools, or both.

Thus, in accordance with the invention, the filler deposition rate is increased by using multiple, thin filler wires, rather than a single, thicker wire fed at the same volumetric rate. The convection heat transfer rate into the filler from the heat source is strongly controlled by the surface area of the filler. Multiple, thin fillers have significantly more surface area than a single, thick filler of the same cross-sectional shape, and allow the surface and subsequently the interior of the filler to become molten at a faster rate.

In addition, thin fillers which are aligned parallel to the depth of a reduced width joint can fit within a nozzle of lesser thickness than one for a thicker filler, and so by using multiple thin fillers and a thinner nozzle, the minimum joint width that can be reliably completed can be reduced even further Therefore, the combined use of multiple, aligned thin fillers for a faster melt-off rate (for a predetermined heat input to the joint) and a thinner, non-circular hole nozzle (such as can be easily fabricated using shim stock as a stiff assembly with a non-circular hole), ensures that the fastest filler deposition rate together with the smallest joint volume are achieved. By simultaneously maximizing the filler deposition rate and minimizing the joint width (and corresponding volume for a given thickness of parent materials), the overall productivity of the welding process can be increased significantly.

BRIEF DESCRIPTION OF THE DRAWINGS

FIG. 1 is a schematic showing a sectional view of a multiple-filler nozzle comprising a flattened tube in accordance with a first preferred embodiment of the invention, the section being taken along a plane intersecting the centerline axis of the filler nozzle.

FIG. 2 is a schematic showing a cross-sectional view of the multiple-filler nozzle of FIG. 1, the cross section being taken along line A—A shown in FIG. 1.

FIG. 2A is a schematic showing a cross-sectional view of an alternative multiple-filler nozzle in accordance with the present inevntion.

FIGS. 3 and 4 are schematics showing sectional views of multiple-filler nozzles in accordance with second and third preferred embodiments of the invention, the section being taken along a plane intersecting the centerline axis of the filler nozzle.

DETAILED DESCRIPTION OF THE PREFERRED EMBODIMENTS

Figure 7:
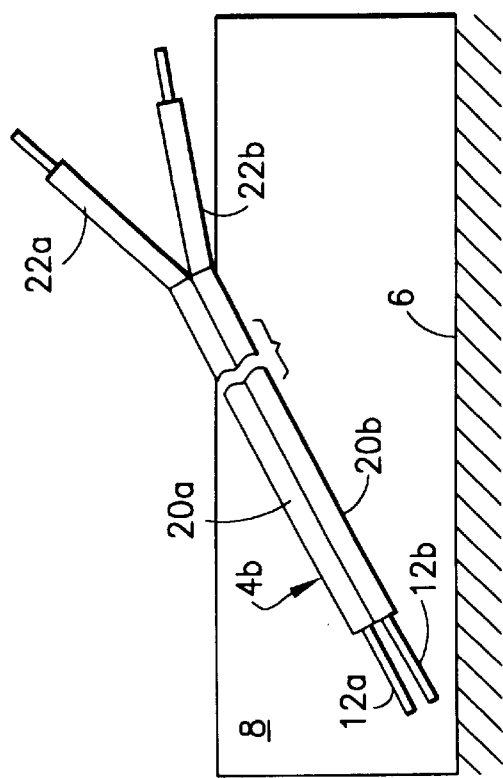
FIG. 7 is a schematic showing a side view of the multiple-filler nozzle depicted in FIG. 5.

The invention consists of a filler nozzle through which two or more filler wires can be fed to a predetermined small area in or near the edge of a molten pool of metal, which when solidified joins the parent materials in a welding operation. A preferred application for the invention is a joint design with the sidewalls close enough to each other so that they can be reliably bridged by a single fill pass per layer, without the use of cross-seam oscillation (lateral manipulation of the heat source, filler nozzle, or both relative to the work pieces).

In accordance with one type of preferred embodiment, the nozzle is constructed so that the multiple filler wires exiting the nozzle outlet are arranged laterally across or "horizontal" to the joint, which exposes the maximum surface area of the filler to the direct impingement of the heat source. A type of second preferred embodiment is with the multiple filler wires arranged parallel or "vertical" to the centerline of the joint (an over-and-under configuration) so that the nozzle can be made as thin as possible. The minimum nozzle thickness is essentially the same or less than that required for a single filler of the same thickness. It will be recognized that the multiple-filler nozzle may be stiffer than a single-filler nozzle, as desired, since the nozzle material for the second and subsequent filler wires adds to the nozzle width, but not to the thickness.

The basic form of the invention consists of (but is not limited to) two filler wires of about the same diameter, fed simultaneously, and at approximately the same speed, through a nozzle of non-circular cross section to the weld pool. Two general types of usage can occur: either cold-wire feed or hot-wire feed, depending on the needs of each weld pass or portion thereof. One preferred embodiment is a central tube with an oval hole, formed by flattening a tube with a conventional round hole. A second preferred embodiment is an assembly fabricated by forming a flat side on each of two tubes and then joining the flat sides together. This fabrication technique can be extended to provide a filler nozzle consisting of more than two tubes joined in a planar array. For cold-wire welds, the flattened tube or joined tubes may be made of any durable, ductile material such as steel; for hot-wire welds, the tube or tubes may be made of a material with similar properties, preferably one with high electrical conductivity, such as copper. For hot-wire welding, the tube is preferably insulated from coming in electrical contact with the joint walls in order to prevent inadvertent grounding.

The multiple filler wires may be fed either by a single drive system, or by multiple drive systems which have a means of allowing the wires to converge before or as they enter the nozzle. For a filler nozzle comprising a flattened tube with a single hole, the entrance end of the hole may be circular (as in an unflattened tube) in the portion of the nozzle not extending into the joint. The fillers will naturally orient themselves along the major axis of the non-circular portion of the hole.

The orientation of the wires at the outlet of the filler nozzle can be directly in line with or inclined relative to the direction of the heat source (such as the axis of an electric arc or laser beam), which places the wires in a chosen position in the lateral temperature distribution of the heat source. One preferred position is in line with the tip of an electric arc electrode, where the plasma temperatures are the highest and the filler melting rate is greatest.

In accordance with a first preferred embodiment depicted in FIGS. 1 and 2, an electrode 2 and a filler nozzle 4 are aligned in the plane of a groove extending above the work surface 6 and formed by a first sidewall 8 and a second sidewall (not shown) opposing the first sidewall. The sidewalls are preferably mutually parallel or form a very small angle, e.g., less than 5°. For TIG welding, the electrode is powered by a TIG arc power supply (not shown), forming an arc 10 between the tip of the electrode 2 and the work surface 6. The tips of first and second filler wire 12a and 12b are immersed in a molten puddle 14 and melted by arc 10. As the electrode and filler nozzle travel in unison along the groove, the trailing edge of the puddle cools and fuses to form a weld bead. This process continues until a weld pass is completed.

In accordance with the first preferred embodiment, the filler nozzle is fabricated by flattening a circular tube into a non-circular cross section. In the example shown in FIG. 2, the flattened sides of the tube are generally parallel and the rounded ends are semicircular in cross section with an inner radius greater than the radius of the filler wires. The height of the guide channel inside the nozzle must be greater than two times the wire diameter. Alternatively, the filler nozzle may have an elliptical or oval cross section.

In FIG. 2, the height direction of the non-circular nozzle lies in the plane of the joint. Likewise the curvature of the nozzle lies in the plane of the joint. However, it will be readily appreciated that the end of the nozzle may be straight. In accordance with a further variation suitable for use in sufficiently wide grooves, the nozzle can be arranged with both tubes lying in a plane perpendicular to the plane of the joint, so that the tips of the filler wires enter the weld puddle side-by-side instead of one above the other.

Alternatively, a multiple-filler-wire nozzle 4a, shown in FIG. 2A, can be fabricated by tack welding two strips to two sheets in a rectangular configuration. In the case where filler wires 12a and 12b have equal wire diameter, the rectangular guide channel of nozzle 4a has a width greater than the wire diameter and a height greater than two times the wire diameter.

FIG. 3 shows one arrangement for feeding multiple filler wires into the nozzle 4 of FIG. 1. The entry end of nozzle 4 is welded or brazed to an outlet of a monolithic wire guide block 16 having two guide channels 14a and 14b machined therein. The guide channels converge at their outlets to communicate with the non-circular inlet of the nozzle. Filler wire 12a is unwound from a first spool (not shown) and enters the nozzle 4 via guide channel 14a, while filler wire 12b is unwound from a second spool (not shown) and enters the nozzle 4 via guide channel 14b.

FIG. 4 shows another arrangement for feeding multiple filler wires into the nozzle 4 of FIG. 1. The entry end of nozzle 4 is welded or brazed to the outlets of a pair of wire guide tubes 18a and 18b of circular cross section. The guide tubes converge at their outlets to communicate with the non-circular inlet of the nozzle. Filler wire 12a enters the nozzle 4 via guide tube 18a, while filler wire 12b enters the nozzle 4 via guide tube 18b.

For both embodiments shown in FIGS. 3 and 4, the filler wires 12a and 12b may be fed into multiple-filler nozzle 4 by driving the wires with a stacked set of respective single-groove drive roll pairs (not shown) rotatably mounted on mutually parallel shafts. Alternatively, the multiple filler wires may be fed with a single pair of drive rolls (not shown) having multiple grooves. Although only two wires are shown in FIGS. 1–4, the present invention encompasses the concept of feeding two or more wires through a multiple-filler nozzle formed from a flattened tube. To vary the relative speed of only some of the multiple wires, they may be fed with additional independently driven or synchronously driven and controlled sets of rolls as required.

Figure 6:
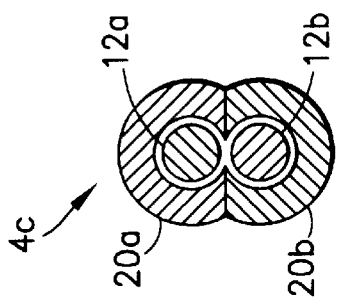
FIGS. 5 and 6 are schematics showing cross-sectional views of two variations of a multiple-filler nozzle made by joining a pair of tubes along a plane in accordance with a fourth preferred embodiment of the invention.
Figure 5:
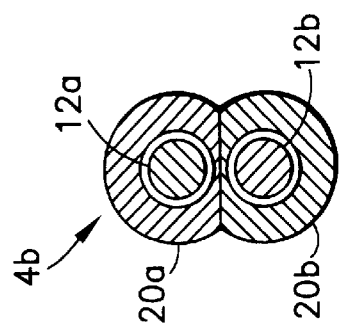

In accordance with a second preferred embodiment shown in FIG. 5, the multiple-filler nozzle 4' is fabricated from tubes 20a and 20b, each tube having a flat face machined thereon to form a "D" shape, with the flat faces of the "D"-shaped tubes being soldered or brazed together with minimal wall thickness remaining at the joint. Alternatively, as shown in FIG. 6, a multiple-filler nozzle 4" is fabricated from individual D-shaped tubes 20a and 20b having machined flat faces soldered or brazed together with no wall thickness remaining at the joint, i.e., each tube is machined down to the inner periphery. This method provides the closest spacing of the filler wires 12a and 12b to each other.

The filler wires can be fed into the nozzle either by individual full-tube extensions 22a and 22b joined at the inlet end of the nozzle (as shown in FIG. 7), by the monolithic block shown in FIG. 3, or by a single tube having a larger inside diameter hole joined at the nozzle inlet, which larger-diameter tube has its axis aligned with the bonded machined tubes forming the outlet portion of the nozzle. Optionally, the machined tubes can have their flat faces cut at a small angle relative to the centerline of the uncut tube, so as to provide convergence of the wires passing through the holes to a common point at the work surface during their use. Preferably, the filler wires exiting the nozzle travel in directions that converge near or at the focus (highest energy density/temperature portion) of the heat source for more thermally efficient and faster capability melting.

The tubing used in the present invention can be made of tungsten (such as is produced by the chemical vapor deposition technique), or of other high-strength, wear-resistant material, such as metal carbide.

The multiple-filler nozzle of the present invention can be used as part of a gas tungsten arc welding (GTAW) system adapted for welding a reduced-width groove to form a welded joint between two parts. The GTAW system has mechanized torch movement and a flat tungsten electrode with a geometry designed to fit in the reduced-width groove. The electrode is mounted in the torch block (not shown) and the filler nozzle is supported by a laterally mounted filler nozzle bracket which is separate from the torch block. The torch block and filler nozzle mount are linked via conventional equipment to achieve synchronized travel of the electrode and filler nozzle. For reduced-width groove welding, the sidewalls of the groove preferably have an acute angle less than 5°. The blade of the electrode has a non-circular cross section. In particular, the blade cross section has an elongated dimension which is oriented parallel to the length of the weld joint and a shortened dimension which is oriented perpendicular to the length of the joint, e.g., a cylinder having a generally rectangular cross section.

The weld beads are deposited inside the groove using the thin elongated tungsten alloy electrode to melt the filler wires fed into the groove by a multiple-filler nozzle fabricated in accordance with the invention. The electrode fits inside the groove with clearance between the electrode and sidewalls. The blade of the electrode is optionally covered with a ceramic coating to prevent arcing to the sidewalls of groove. The welding electrode is powered by a conventional arc power supply (not shown) to produce a welding arc. The flat electrode and flat multiple-filler nozzle, in conjunction with the small bevel angle and selected welding parameters, produce a very thin weld joint. During welding, the arc is preferably observed using at least one remote viewing device (e.g., a camera).

In accordance with the preferred embodiments of the invention, the filler material nozzle apparatus has a non-circular cross section. In particular, the cross-sectional shape of the filler material guide nozzle assembly is designed to be thin in a direction perpendicular to the depth and length of the weld seam, and wide in a direction parallel to the seam. However, the present invention can also be used to fabricate multiple-filler nozzles in which the filler wires are side by side in a plane perpendicular to the plane of the joint, i.e., spaced in the lateral direction.

The reasons for using a non-circular nozzle apparatus include the following: a) to provide a lateral stiffness to the nozzle sufficient to maintain adequate filler metal position guidance, while providing only the minimum practical width (in a direction perpendicular to the walls) when used in joints of reduced width which would otherwise be too narrow to be filled; b) to provide increased nozzle flexural strength both parallel and perpendicular to the joint depth so that the desired filler metal guidance is maintained, despite inadvertent physical handling or abusive nozzle mechanized steering; and c) to provide a minimum nozzle width (in a direction perpendicular to the weld seam) so that the view in the joint from a remote weld-viewing camera is not obstructed by the portion of the nozzle passing through the view.

In accordance with the present invention, curved holes for the filler guide path are preferred over straight holes for the following functional reasons:

a) One benefit of curved holes is that they maintain planar alignment and convergence of the typically curved filler materials as they exit the nozzles. The remaining curvature ("cast") of the fillers after they have been unwound from a spool can lead to significant deviation from their respective aim positions if the direction of the curvature is allowed to find its own azimuthal position with respect to the axis of the nozzle hole.

b) A second benefit of the curved nozzle is the significantly shorter length of nozzle that is required to reach from the outside of a joint to the root area. This feature becomes more important as either the thickness of the materials being joined increases, or as the filler entry angle (with respect to the surface of the root) decreases.

c) A third benefit is that as the curvature of the nozzle approaches the approximate curvature of the filler (rather than forcing the filler to a straight configuration within the nozzle), the sliding friction between the filler and the filler nozzle diminishes. This reduction in friction allows the reliable feeding of finer (more thermally efficient melting) filler materials without the inherently increased risk of buckling at unsupported portions of the length in axial compression, such as occurs downstream of the feeder mechanism.

d) A fourth benefit is that the preferred shorter nozzle, as described in ¶ b) above, will be lighter for a predetermined cross-sectional shape, in turn reducing the load requirements for stable positioning for other manipulators of the torch assembly, such as oscillation and voltage control actuators.

e) A fifth benefit for curved, shorter nozzles is that they are stiffer and can therefore maintain an improved filler material aim point during rough handling or use, for a predetermined cross-sectional shape of the nozzle.

f) A sixth benefit, applicable to multiple-filler-type nozzles, is that when the filler holes are located on opposite edges of a flat stiffener having a different radius of curvature on each edge, fillers having different degrees of curvature ("cast") can be selectively fed through the hole having the closest match in curvature, in turn obtaining the benefit noted in ¶ c).

The foregoing preferred embodiments of the invention have been disclosed for the purpose of illustration. Variations and modifications of the disclosed method will be readily apparent to practitioners skilled in the art of joining. All such variations and modifications which do not depart from the concept of the present invention are intended to be encompassed by the claims set forth hereinafter.

We claim:

1. A system for welding in a very-reduced-width weld groove, comprising:
    a welding torch;
    a welding electrode extending from said welding torch and having a tip located in the weld groove;
    a tube having a channel of non-circular cross section, said channel having a maximum width and a maximum height, said maximum height being greater than said maximum width, said tube having an outlet located in the weld groove and aimed at a location beneath said electrode tip; and
    a first filler wire passing through said channel of said tube, said first filler wire having a first wire diameter less than said maximum width.

2. The system as defined in claim 1, wherein said channel has an oval cross section.

3. The system as defined in claim 1, wherein said channel has an elliptical cross section.

4. The system as defined in claim 1, wherein said channel has a pair of mutually parallel opposing surfaces separated by said maximum width.

5. The welding system as defined in claim 1, further comprising a second filler wire passing through said channel of said tube, said second filler wire having a second wire diameter less than said maximum width, wherein the sum of said first and second wire diameters is greater than said maximum width and less than said maximum height.

6. The system as defined in claim 5, wherein said first wire diameter is equal to said second wire diameter.

7. The welding system as defined in claim 1, wherein a distal section of said tube has a curved axis of symmetry.

8. A filler nozzle having a non-circular cross-sectional shape adapted to fit in a very-reduced-width weld groove, comprising:
    a tube having a channel of non-circular cross section, said channel having a maximum width and a maximum height, said maximum height being greater than said maximum width; and
    a first filler wire passing through said channel of said tube, said first filler wire having a first wire diameter less than said maximum width, wherein a distal section of said tube has a curved axis of symmetry.

9. A method for guiding filler wire into a groove between two workpieces to be joined, comprising the steps of:
    flattening a tube having a channel of circular cross section to deform said channel to have a non-circular cross section;
    inserting one end of said flattened tube into the groove; and
    feeding a filler wire through said non-circular channel of said flattened tube and into the groove.

10. A filler nozzle having a non-circular cross-sectional shape adapted to fit in a very-reduced-width weld groove, comprising:
    a first tube having a first channel of circular cross section and a first external flat face running the length of said first tube;
    a second tube having a second channel of circular cross section and a second external flat face running the length of said second tube; and
    means for joining said first and second tubes to each other with said first and second external flat faces juxtaposed and in mutual abutment;
    a first filler wire passing through said first channel; and
    a second filler wire passing through said second channel.

11. The filler nozzle as defined in claim 10, wherein a distal section of each of said first and second tubes has a predetermined curvature.

12. The filler nozzle as defined in claim 10, wherein said first and second channels are equal in diameter.

13. A system for welding in a very-reduced-width weld groove, comprising:
    a welding torch;
    a welding electrode extending from said welding torch and having a tip located in the weld groove;
    a first tube having a first channel of circular cross section and a first external flat face running the length of said first tube, and having an outlet located in the welding groove;
    a second tube having a second channel of circular cross section and a second external flat face running the length of said second tube, and having an outlet located in the welding groove; and
    means for joining said first and second tubes to each other with said first and second external flat faces juxtaposed and in mutual abutment;

a first filler wire passing through said first channel; and a second filler wire passing through said second channel.

14. The welding system as defined in claim 13, wherein a distal section of each of said first and second tubes has a predetermined curvature.

15. The welding system as defined in claim 13, wherein said first and second channels are equal in diameter.

16. A method for guiding filler wire into a groove between two workpieces to be joined, comprising the steps of:

forming a first external flat face along the length of a first tube having a channel of circular cross section;

forming a second external flat face along the length of a second tube having a channel of circular cross section;

joining said first and second tubes to each other with said first and second external flat faces juxtaposed and in mutual abutment;

inserting one end of said joined tubes into the groove; and passing first and second filler wires through said first and second channels respectively and into the groove.

17. A method for melting filler wire in a groove between two workpieces to be joined, comprising the steps of:

inserting a tip of a welding electrode and one end of a tube in said groove, said electrode tip being positioned above a work surface and outside ot said tube, and said tube having a channel with a non-circular cross section, said channel having a maximum height and a maximum width, and having an outlet directed toward a location beneath said electrode tip; and simultaneously passing first and second filler wires through said non-circular channel of said tube and into the groove, said first filler wire having a first diameter, said second filler wire having a second diameter, said maximum height of said channel being greater than the sum of said first and second diameters, and said maximum width of said channel being less than the sum of said first and second diameters, but greater than the larger one of said first and second diameters.

18. A method for guiding filler wire into a groove between two workpieces to be joined, comprising the steps of:

flattening a portion of a tube having a channel of circular cross section to deform said channel to have a non-circular cross section in said flattened portion, said flattened portion including one end of said tube and an unflattened portion of said tube including the other end of said tube;

inserting said one end of said flattened portion of said tube into the groove; and feeding first and second filler wires into said other end of said tube, through said channel of said tube and out said one end of said tube so that respective ends of said first and second filler wires are concurrently located in the groove.

19. An apparatus comprising a filler wire having a diameter and a filler wire guide nozzle comprising first and second strips connected to first and second sheets, said first and second strips and said first and second sheets forming a channel having a non-circular cross section with a first dimension greater than twice said diameter and with a second dimension greater than said diameter and less than twice said diameter.

20. An apparatus comprising a filler wire guide nozzle and a monolithic wire guide block, said filler wire guide nozzle being joined at an inlet end to an outlet end of said monolithic wire guide block, said monolithic wire guide block comprising first and second guide channels machined therein, said filler wire guide nozzle comprising a tube having a channel of non-circular cross section, and said first and second guide channels each having an inlet and converging at an outlet in said inlet end of said monolithic wire guide block which communicates with an inlet of said non-circular channel in said inlet end of said filler guide nozzle.

21. An apparatus comprising a wire guide nozzle and first and second wire guide tubes converging toward and joined to an end of said wire guide nozzle, said wire guide nozzle comprising a tube having a channel of non-circular cross section, and said first and second wire guide tubes each having a channel of circular cross section and an outlet which communicates with an inlet of said non-circular channel in said end of said wire guide nozzle.

* * * * *